Patented Apr. 23, 1946

2,398,945

UNITED STATES PATENT OFFICE 2,398,945

REMOVAL OF ASTRINGENT SUBSTANCES FROM COCOA

George Lawton, Highgate, London, England

No Drawing. Application March 13, 1944, Serial No. 526,321. In Great Britain November 13, 1942

4 Claims. (Cl. 99—23)

The most important condition in the production of fine chocolate is the removal of the astringent substances from the cocoa beans, and the invention relates to this problem, which arises in the roasting of the cocoa beans.

If the substances giving the chocolate its aroma are not to be destroyed, the roasting must be kept moderate, but the result then is that the astringent substances contained in the cocoa bean, e. g., tannic acid, acetic acid, tartaric acid and oxalic acid are not removed. This removal could hitherto only be effected by subjecting the cocoa beans to high temperatures, which then removed not only the greater part of the astringent matters but also the fugitive aromas which give the chocolate its distinctive flavour. Literature recommends the use of high temperatures for roasting until the small of vinegar has vanished, even at the risk of losing the light aromatic substances.

The present-day market for fine chocolate demands, however, the presence of those very fine and easily fugitive aromatic substances, so that the manufacturer is faced with the problem of roasting at low temperatures to retain the aromatic substances and of trying to remove the astringent matters later in the manufacturing process. This is at present effected after the grinding of the cocoa bean by mixing the beans with sugar and other additions according to recipe, comminuting them mechanically and finally subjecting them to an intense heat treatment in so-called "conches" for developing the aroma and driving out the astringent matters. In order to complete the driving out of the astringent matters, the heat treatment has to extend over 70 to 80 hours.

The object of the present invention is to achieve the desired end in a considerably simpler manner.

According to the invention the cocoa beans are roasted at a temperature only high enough to remove the greater part of the moisture, and are then ground and subjected to a heat and aerating treatment. A suitable roasting temperature is about 140° to 150° F.; it should not exceed 165° F. The duration of roasting in a modern hot air roaster may be 15 to 20 minutes. The development of the aroma and the removal of the astringent matters then take place within a few hours.

The explanation of this fact is that in the original method the astringent matters have become so intimately bound up with the sugar and the other constituents of the chocolate by the intense mechanical comminution that the separation therefrom in the conche no longer takes hours, but days. By means of the invention the cocoa liquor is for all practical purposes completely freed from the tannins before it is mixed with the other ingredients, such as sugar, etc. Consequently, the conche treatment necessary in the new method need not extend over days but is limited to a few hours.

The heating and aeration treatment is best effected at about 100 to 160 degrees Fahrenheit and is preferably continued for about 3 to 6 hours. The figures given may, however, be modified to a certain extent. The aeration can be effected by fresh air. If desired, a vacuum can be utilised or fresh air can be supplied under pressure, e. g., by a fan.

What I claim is:

1. The method of removing the astringent matters from cocoa which comprises the steps of roasting the cocoa beans at about 140 to 150° F. for 15 to 20 minutes, grinding them and subjecting the resulting cocoa liquid to a heating and aeration treatment at about 100 to 160° F. for approximately 3 to 6 hours.

2. In the manufacture of chocolate the method of removing the astringent matters from the cocoa which comprises the steps of roasting the cocoa beans in their ordinary commercial condition so that the temperature of the beans does not exceed 165° F. and so as to remove the greater part of the moisture, grinding them and subjecting the resulting cocoa liquor while substantially free from sugar and other additional ingredients to a simultaneous heating and aeration treatment, only thereafter incorporating the sugar or other additional ingredients.

3. In the manufacture of chocolate the method of removing the astringent matters from the cocoa which comprises the steps of roasting the cocoa beans in their ordinary commercial condition so that the temperature of the beans does not exceed 165° F. and so as to remove the greater part of the moisture, grinding them and subjecting the resulting cocoa liquor while substantially free from sugar and other additional ingredients to a simultaneous heating and aeration treatment at about 100 to 160° F. for approximately 3 to 6 hours, only thereafter incorporating the sugar or other additional ingredients.

4. In the manufacture of chocolate the method of removing the astringent matters from the cocoa which comprises the steps of roasting the cocoa beans in their ordinary commercial condition at about 140 to 150° F. for 15 to 20 minutes, grinding them and subjecting the resulting cocoa liquor while substantially free from sugar and other additional ingredients to a simultaneous heating and aeration treatment, only thereafter incorporating the sugar and other additional ingredients.

GEORGE LAWTON.